US008807609B2

(12) United States Patent
Stallbaumer

(10) Patent No.: US 8,807,609 B2

(45) Date of Patent: Aug. 19, 2014

(54) DOOR LOCK WITH REMOVABLE HANDLE AND PUCK LOCK

(75) Inventor: John Stallbaumer, Topeka, KS (US)

(73) Assignee: PTMW, Inc., Topeka, KS (US)

( * ) Notice: Subject to any disclaimer, the term of this patent is extended or adjusted under 35 U.S.C. 154(b) by 197 days.

(21) Appl. No.: 13/440,005

(22) Filed: Apr. 5, 2012

(65) Prior Publication Data

US 2013/0264834 A1 Oct. 10, 2013

(51) Int. Cl.
*E05B 9/02* (2006.01)
*B23P 19/00* (2006.01)

(52) U.S. Cl.
USPC ............ 292/337; 292/1; 292/336.3; 292/347; 292/348; 292/DIG. 27; 70/54; 70/203; 70/DIG. 43

(58) Field of Classification Search
USPC ............ 292/1, 336.3, DIG. 27, DIG. 68, 337, 292/347, 348; 70/2, 6, 32–34, 54–56, 202, 70/203, 211, 212, DIG. 43, DIG. 56
See application file for complete search history.

(56) References Cited

U.S. PATENT DOCUMENTS

| | | | | |
|---|---|---|---|---|
| 1,197,524 | A * | 9/1916 | Medart | 292/159 |
| 1,424,533 | A * | 8/1922 | Vance | 70/81 |
| 1,719,272 | A * | 7/1929 | Lee | 70/212 |
| 2,177,249 | A * | 10/1939 | Hammerly | 200/50.01 |
| 2,473,937 | A * | 6/1949 | Cameron | 292/348 |
| 3,843,173 | A * | 10/1974 | Harrell | 292/7 |
| 3,922,893 | A * | 12/1975 | Berg | 70/13 |
| 4,126,023 | A * | 11/1978 | Smith et al. | 70/177 |
| 4,480,451 | A * | 11/1984 | Fujiya | 70/92 |
| 4,676,534 | A * | 6/1987 | Hix, Jr. | 292/205 |
| 4,754,626 | A * | 7/1988 | Siegel | 70/32 |
| 5,000,494 | A * | 3/1991 | Guibleo | 292/148 |
| 5,014,528 | A * | 5/1991 | Roberts | 70/177 |
| 5,172,574 | A * | 12/1992 | Perfetto | 70/56 |
| 5,184,853 | A * | 2/1993 | Whatley | 292/205 |
| 5,469,722 | A * | 11/1995 | Ellefsen | 70/56 |
| 5,579,804 | A * | 12/1996 | Roberts | 137/385 |
| 5,806,351 | A * | 9/1998 | Learnahan | 70/56 |
| D409,072 | S * | 5/1999 | Clavin | D8/301 |
| 5,946,952 | A * | 9/1999 | Mintchenko | 70/2 |
| 6,044,673 | A * | 4/2000 | Jefferson | 70/212 |
| 6,119,494 | A * | 9/2000 | Whitfield | 70/177 |
| 6,357,268 | B1 * | 3/2002 | Takimoto | 70/208 |
| 6,467,317 | B1 * | 10/2002 | Hillabush et al. | 70/56 |

(Continued)

FOREIGN PATENT DOCUMENTS

| | | | | |
|---|---|---|---|---|
| DE | 2831514 | * | 1/1980 | |
| WO | WO 8301645 A1 | * | 5/1983 | E05B 67/38 |

*Primary Examiner* — Carlos Lugo

(74) *Attorney, Agent, or Firm* — Stinson Leonard Street LLP

(57) ABSTRACT

The present invention is directed toward a protector for a door latch mechanism. The protector comprises a shaft to which a removable handle is attached, a plate adapted to be fastened to a door, and a shroud extending from the plate and surrounding a portion of the shaft when the removable handle is removed. The shroud is adapted to receive a puck lock for engagement with the shaft when the removable handle is removed. The shroud is adapted to receive the removable handle for engagement with the shaft when the puck lock is removed. The removable handle is operable to rotate the shaft and effect operation of the latch mechanism between latched and unlatched positions. The shroud includes a slot and the removable handle includes a tab such that when the removable handle is rotated, the tab of the removable handle engages the slot of the shroud.

20 Claims, 4 Drawing Sheets

(56) References Cited

U.S. PATENT DOCUMENTS

| | | | | |
|---|---|---|---|---|
| 6,637,243 | B2 * | 10/2003 | Lemley et al. | 70/56 |
| D488,983 | S * | 4/2004 | Linares | D8/301 |
| 6,748,776 | B2 * | 6/2004 | Bullock et al. | 70/212 |
| D492,570 | S * | 7/2004 | Linares | D8/308 |
| 7,204,105 | B2 * | 4/2007 | Hooper et al. | 70/2 |
| 7,418,846 | B2 * | 9/2008 | James et al. | 70/159 |
| 7,690,701 | B2 * | 4/2010 | Van Ravenhorst | 292/194 |
| 8,266,932 | B2 * | 9/2012 | Longwell | 70/56 |
| 8,449,003 | B2 * | 5/2013 | Bunker et al. | 292/336.3 |
| 8,702,184 | B2 * | 4/2014 | Lakoduk et al. | 312/222 |

* cited by examiner

Fig.1.
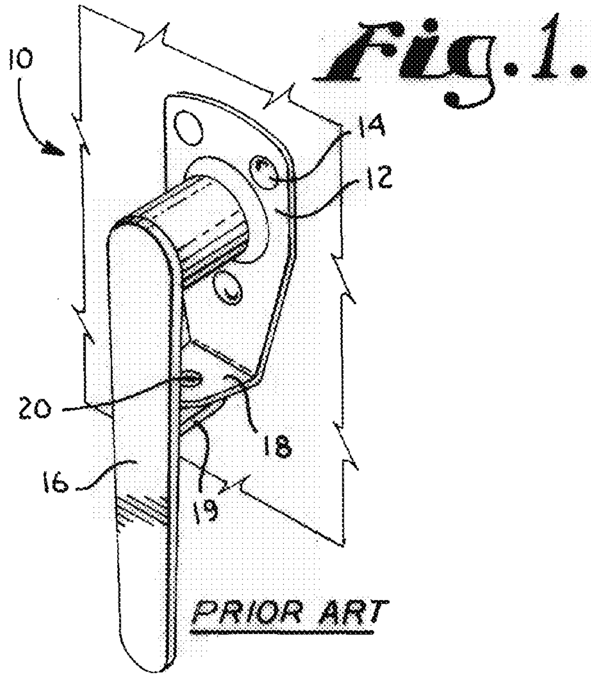
Fig.3
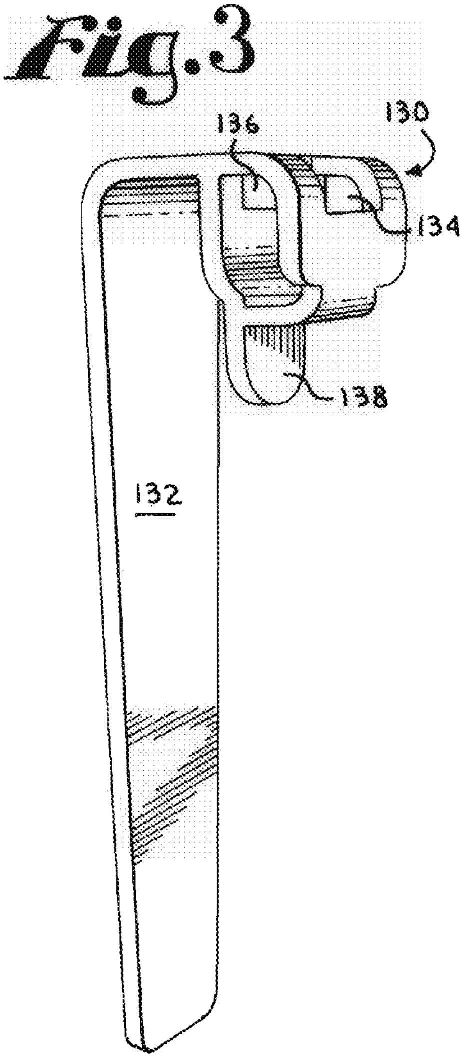
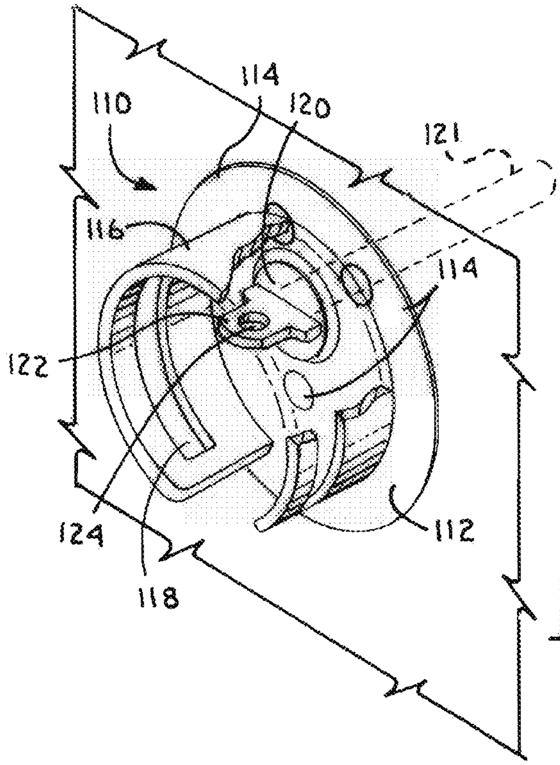
Fig.2.

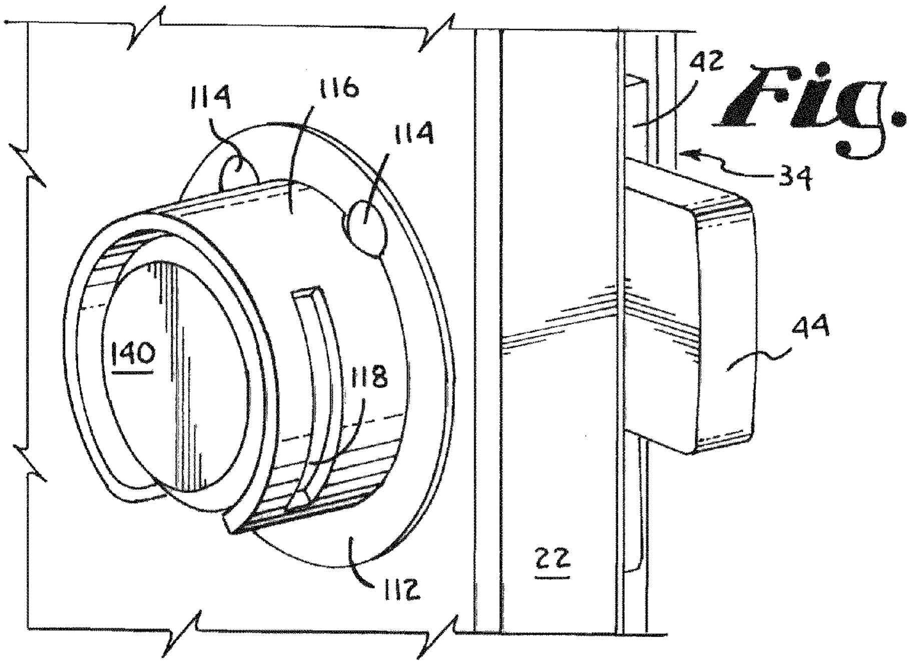
Fig. 10.
Fig. 6.
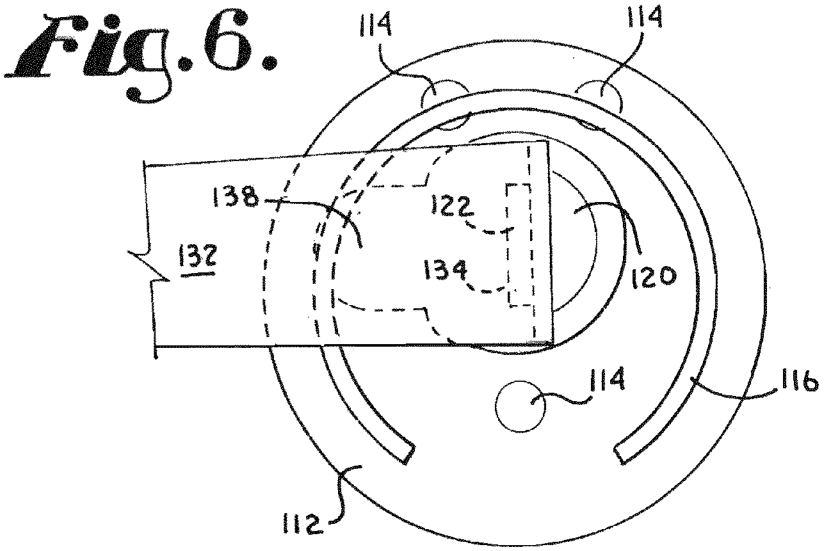

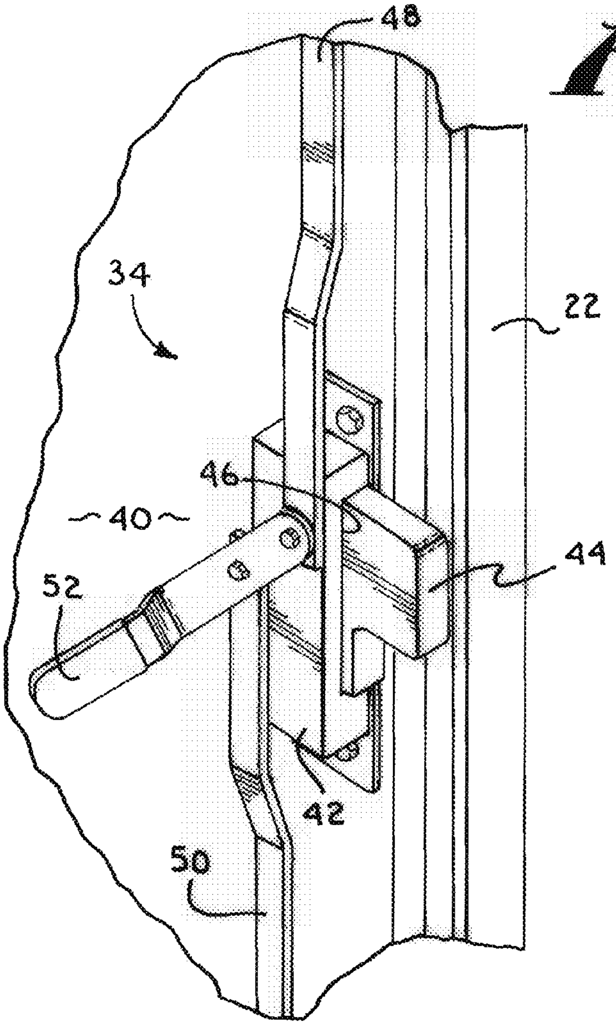
Fig. 7.
Fig. 9.
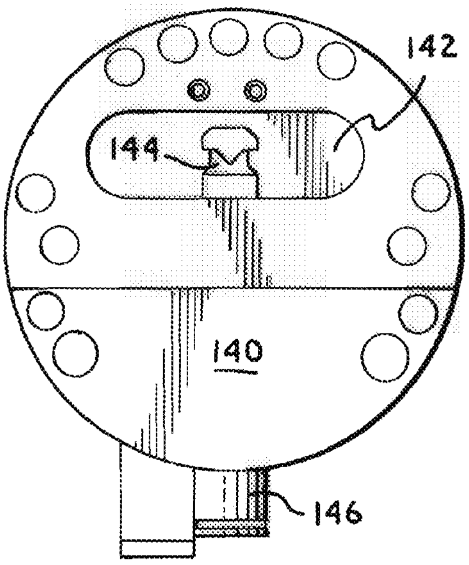

DOOR LOCK WITH REMOVABLE HANDLE AND PUCK LOCK

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention is related to door latch mechanisms and locks, and more particularly to a protector for protecting the door latch mechanism and lock.

2. Description of Related Art

Door latch mechanisms with handle assemblies are routinely used for opening and closing doors. A door handle assembly may have a shaft extending through a door and a handle coupled to the shaft and spaced a distance from the door. The handle is typically used to rotate the shaft. This rotation effects operation of a door latch mechanism between a latched and an unlatched position.

A variety of lock mechanisms are used with door handles in order to prevent unwanted persons from opening doors. One type of lock mechanism secures the handle to the door with a padlock, thus preventing a person from rotating the shaft coupled to the handle. Another type of lock mechanism comprises a first bracket on the door and a second bracket on a surface (i.e., a second door, wall, or doorjamb) exterior to the door. The brackets have portions that align when the door is closed such that a lock passing through holes in the aligned portions prevents the brackets from being separated, and thus prevents the door from being opened. Known brackets also can form a surrounding shroud to protect the locking device securing the brackets. The surrounding shroud can be integrated into a single side of the bracket, or each side of the bracket can form a portion of the shroud such that the surrounding shroud is formed when the brackets interlock. Known locking devices include padlocks, combination locks, puck locks, etc. Known brackets locked with a puck lock can have a shroud that surrounds a portion of the puck lock when the puck lock is securing the brackets. Typically the bracket locking mechanisms are separate from the door handle.

FIG. 1 depicts a typical prior art lock mechanism and door handle secured with a padlock. Assembly 10 comprises a plate 12 attached to a door via fasteners 14. Handle 16 is attached to an operating shaft operable to operate the latch mechanism (not shown). Plate 12 has a plate tab 18 that aligns with a handle tab 19 of handle 16. Both plate tab 18 and handle tab 19 have an aperture therethrough, such that when plate tab 18 aligns with handle tab 19, aperture 20 is formed. Typically a padlock passes through aperture 20 to lock the door. A padlock passing through aperture 20 prevents handle 16 from being rotated and prevents the shaft from operating the latch mechanism.

Handles and brackets are typically made of soft metal subject to destruction by bending or cutting with saws or bolt cutters. A handle may be particularly vulnerable at its coupling with the shaft. It is known to use a protector or shroud with a lock, but this type of protector does not provide any protection for the handle. Additionally, given, enough time and effort, even these protectors and locks may be bent or cut away to allow access to the lock, handle, and latch mechanism. It is desirable to protect the latch mechanism and handle in a way that the protector, handle, latch mechanism, and locking mechanism cannot be vandalized.

BRIEF SUMMARY OF THE INVENTION

The present invention is directed toward a protector for a door latch mechanism. The protector comprises a shaft to which a removable handle is attached, a plate adapted to be fastened to a door, and a shroud extending from the plate and surrounding a portion of the shaft when the removable handle is removed. The shroud is adapted to receive a puck lock for engagement with the shaft when the removable handle is removed. The shroud is adapted to receive the removable handle for engagement with the shaft when the puck lock is removed. The shaft projects into the door for operating the latch mechanism. The removable handle is operable to rotate the shaft and effect operation of the latch mechanism between latched and unlatched positions. The shroud includes a slot and the removable handle includes a tab such that when the removable handle is rotated, the tab of the removable handle engages the slot of the shroud.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 1 is a perspective view of a prior art door handle and lock mechanism;

FIG. 2 is a perspective view of one exemplary embodiment of a protector for use with a door latch mechanism having a removable handle, showing the protector with the removable handle removed;

FIG. 3 is a perspective view of the removable handle;

FIG. 6 is a front view of the protector with the removable handle rotated to a second horizontal position;

FIG. 7 is a fragmentary perspective view of a door showing the latch mechanism mounted to an inside surface of the door;

FIG. 9 is a back view of a puck lock; and

FIG. 10 is a perspective view of the protector with a puck lock.

DETAILED DESCRIPTION OF PREFERRED EMBODIMENT

Figure 4:
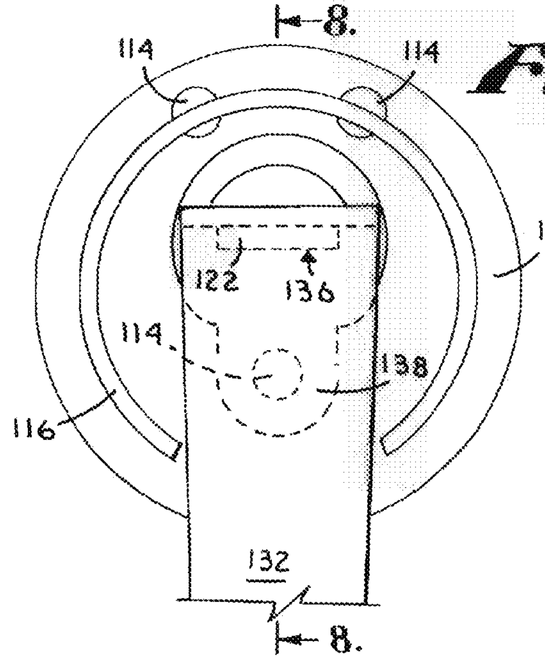
FIG. 4 is a front view of the protector with the removable handle in a vertical position.

Description:

Protector 110 for use with a door latch mechanism 34 is depicted in FIGS. 2-10. Protector 110 includes a plate 112, a shroud 116, a washer 120, and a connector 122. As depicted in FIG. 2, shroud 116 includes a slot 118, and connector 122 includes an aperture 124. Plate 112 is mounted to door 22 with a plurality of fasteners 114. Shroud 116 does not completely encircle washer 120 and connector 122. Shroud 116 extends over an arc between from about 250 degrees to about 350 degrees. As depicted in FIGS. 2 and 10, slot 118 does not extend the entire distance of shroud 116. Slot 118 is in two portions and extends from about ten percent to about eighty percent of the distance of shroud 116. Connector 122 is coupled to a shaft 21 (shown in FIG. 2) that passes through washer 120 and plate 112 and projects into door 22 to operate latch mechanism 34 (shown in FIG. 7). Rotation of connector 122 causes rotation of shaft 121. As depicted in FIGS. 2, 4, 5, and 6, shroud 116 is substantially perpendicular to plate 112, and shroud 116 and plate 12 are integral. Connector 122 and shaft 121 are also substantially perpendicular to plate 112.

Figure 8:
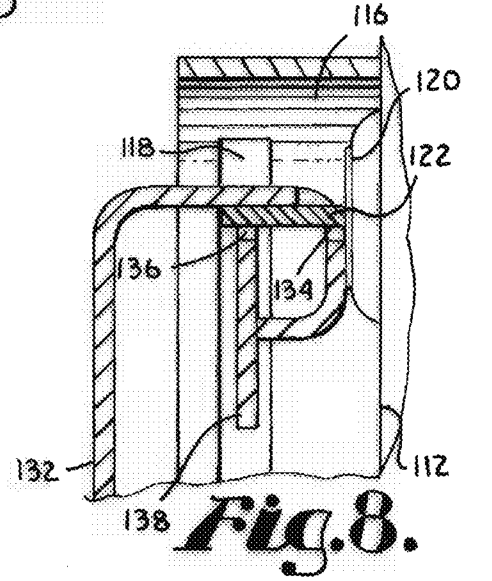
FIG. 8 is a cross-sectional view along the line 8-8 in FIG. 4.
Figure 5:
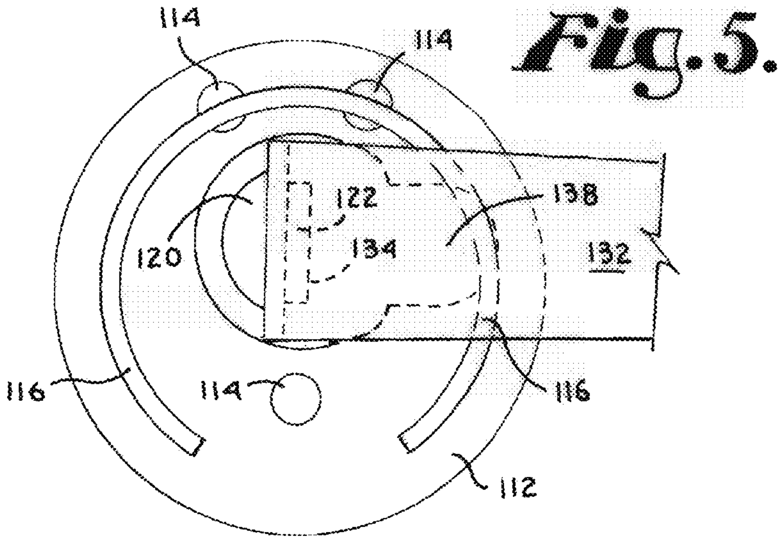
FIG. 5 is a front view of the protector with the removable handle rotated to a first horizontal position.

As depicted in FIG. 3, removable handle 130 comprises a handle portion 132, a first opening 134, a second opening 136, and a tab 138. Openings 134, 136 are configured to receive connector 122. When connector 122 is inserted into openings 134, 136, removable handle 130 extends substantially perpendicular to connector 122 and shaft 121. Removable handle 130 is operable to rotate shaft 121 to effect operation of latch mechanism 34 (shown in FIG. 7) between a latched position and an unlatched position. As depicted in FIGS. 4 and 8, when removable handle 130 is in a vertical position, tab 138 does not engage slot 118 of shroud 116. As depicted in FIG. 5, when removable handle 130 is rotated counterclockwise to a horizontal position, shaft 121 effects operation of latch mechanism 34 to its latched position. In the horizontal position depicted in FIG. 5, tab 138 engages slot 118 of shroud 116. If removable handle 130 is then returned to its vertical position, latch mechanism 34 remains in its latched position and tab 138 disengages slot 118 of shroud 116. As depicted in FIG. 6, when removable handle 130 is rotated clockwise to a horizontal position, shaft 121 effects operation of latch mechanism 34 to its unlatched position. In the horizontal position depicted in FIG. 6, tab 138 engages slot 118 of shroud 116. If removable handle 130 is then returned to its vertical position, latch mechanism 34 remains in its unlatched position. Therefore, when removable handle 130 is in its vertical position, latch mechanism 34 may be in either its latched or unlatched position.

FIG. 7 depicts latch mechanism 34 mounted to the inside surface 40 of door 22. Latch mechanism 34 includes a housing 42 mounted to door 22, a lock 44 extending through an opening 46 in housing 42, a first arm 48 extending upwardly from housing 42, a second arm 50 extending downwardly from housing 42, and a lever 52 connected to each arm 48, 50. Shaft 121 passes through door 22 and is connected to lock 44, first arm 48, and second arm 50. As described above, rotation of shaft 121 moves latch mechanism 34 from its latched position to its unlatched position, and vice versa. FIG. 7 depicts the latched position. In the latched position, first arm 48 and second arm 50 extend beyond the perimeter of door 22, and are received by a door frame (not shown) to secure the door to the frame. Lock 44 may be received by the door frame or simply abut the frame. In the unlatched position, lock 44, first arm 48, and second arm 50 clear the frame, and door 22 can be opened and shut. Lever 52 is connected to first and second arms 48, 50. Rotation of lever 52 effects operation of the latch mechanism 34 from its latched to its unlatched position in the same manner as removable handle 130. However, lever 52 operates independently of removable handle 130 and shaft 121 such that latch mechanism 34 may be operated by lever 52 even if puck lock 140 is engaged and preventing shaft 121 from being rotated as shown in FIG. 10.

FIG. 8 depicts a cross-sectional view of the protector along line 8-8 of FIG. 4. As seen in FIG. 8, connector 122 passes through first opening 134 and second slot 136 to engage removable handle 130. The distance between first opening 134 and second opening 136 is configured such that tab 138 is aligned with slot 118 in shroud 116. When removable handle 130 is rotated, tab 138 engages slot 118 of shroud 116.

As shown in FIGS. 4, 5, and 6, fasteners 114 have the same pattern as fasteners 14 in FIG. 1. This allows protector 110 to be installed using the prior art door latch mechanism (shown in FIG. 7) after assembly 10 is removed. In fact, door latch mechanism 34 can remain in place as only assembly 10 is removed and replaced with protector 110. Thus, protector 110 is quickly and easily installed as it is interchangeable with the prior art assembly.

As shown in FIGS. 2, 4, 5, and 6, connector 122 and shaft 121 are not centered in shroud 116. Connector 122 and shaft 121 are configured to be closer to the top of shroud 116. In one exemplary embodiment, from the top of shroud 116 to the center of connector 122 and shaft 121 is about one third of the distance between the top of shroud 116 and the bottom of shroud 116. Connector 122 and shaft 121 being off center from shroud 116 allows tab 138 to engage with slot 118 when removable handle 130 is rotated to a horizontal position (as seen in FIGS. 5 and 6) while allowing tab 138 not to be engaged with slot 118 when removable handle is in a vertical position (as seen in FIG. 4). Additionally, connector 122 and shaft 121 being off center from shroud 116 makes rotation of connector 122 and shaft 121 impossible when puck lock 140 is engaged with connector 122. The point of rotation being off center causes puck lock 140 to bind against the side of shroud 116 and prevent puck lock 140 and shaft 121 from rotating when any attempt is made to rotate puck lock 140.

FIG. 9 depicts a rear view of puck lock 140. Puck lock 140 includes an opening 142, a locking shaft 144, and a locking portion 146. Puck lock 140 is keyed at locking portion 146. When actuated, locking shaft 144 is extended through opening 142. When de-actuated, locking shaft 144 is pulled down and does not extend through opening 142. FIG. 10 depicts protector 110 with puck lock 140 engaged with protector 110 thereby locking latch mechanism 34. Puck lock 140 prevents shaft 121 from rotating. Puck lock 140 substantially fills shroud 114, but puck lock 140 does not engage shroud 114.

Operation:

In operation, a user wishing to protect door latch mechanism 34 can replace assembly 10 shown in FIG. 1 with protector 110 shown in FIG. 2. Switching protector 110 for assembly 10 is a quick and easy process because the pattern of fasteners 114 matches the pattern of fasteners 14 of the prior art. Installation of protector 110 includes removing the prior art assembly, then attaching protector 110 using the same door latch mechanism.

To unlatch door 22, removable handle 130 engages shaft 121 by connector 122 engaging with slots 134, 136 as shown in FIGS. 4 and 8. Removable handle 130 is rotated clockwise to a horizontal position (shown in FIG. 6), which rotates shaft 121 effecting operation of latch mechanism 34 to its unlatched position. In the horizontal position shown in FIG. 6, tab 138 engages slot 118, and removable handle 130 remains coupled to protector 110 such that door 22 can be pushed or pulled open or shut by holding onto removable handle 130. Removable handle 130 can remain in the horizontal position or can be rotated to its vertical position. Latch mechanism 34 does not change states (i.e., from latched to unlatched or from unlatched to latched) when removable handle 130 is rotated to its vertical position. Removable handle 130 can remain engaged with connector 122 or may be removed.

To latch door 22, when door 22 is closed, removable handle 130 is rotated counterclockwise to a horizontal position (shown in FIG. 5), which rotates shaft 121 effecting operation of latch mechanism 34 to its latched position. In the horizontal position shown in FIG. 5, tab 138 engages slot 118, and removable handle 130 remains coupled to protector 110 such that door 22 can be pushed or pulled by holding onto removable handle 130 to assure latch mechanism 34 is properly engaged with the door frame. Removable handle 130 is then rotated to its vertical position. Latch mechanism 34 does not change states (i.e., from latched to unlatched or from unlatched to latched) when removable handle 130 is rotated to its vertical position. Removable handle 130 can remain engaged with connector 122 or may be removed.

To lock door 22, handle 130 is removed by grasping it and pulling perpendicular to protector 110. Protector 110 without removable handle 130 is shown in FIG. 2. A puck lock 140 is then inserted into shroud 114. Connector 122 rests inside opening 142 in puck lock 140. Puck lock 14C) is actuated and locking shaft 144 engages aperture 124 of connector 122. Puck lock 140 is then locked (i.e., by a user turning a key at locking point 146). Protector 110 with a locked puck lock 140 is shown in FIG. 10.

To unlock door 22, puck lock 140 is removed by unlocking puck lock 14C) (i.e., by a user turning a key at locking point 146), and de-actuating puck lock 140 which disengages locking shaft 144 from aperture 124. Puck lock 140 is then removed from protector 110, and removable handle 130 can then engage connector 122 to unlatch door 22 as described above.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof it is to be understood that all matters herein set forth or shown in the accompanying drawings are to be interpreted as illustrative, and not in a limiting sense. For example, it is understood that shroud 116 could entirely surround connector 122, or could have more than one opening where shroud 116 does not surround connector 122. Also, removable handle 130 may comprise a single opening (i.e., first opening 34), or may comprise more than two openings. Although as depicted in the Figs. and description as integral, it is within the scope of the invention for plate 112 to be rigid with shroud 116 in another manner. For example, plate 112 could be welded to shroud 116, or joined to shroud 116 with fasteners. Connector 122 can be a separate piece coupled to shaft 121, or connector 122 can be integral with shaft 121.

Additionally, although latch mechanism 34 is described as being in a latched position when shaft 121 is rotated in a counterclockwise direction (see FIG. 5) and in an unlatched position when shaft 121 is rotated in a clockwise direction (see FIG. 6), it is understood that latch mechanism 34 could be in an unlatched position when shaft 121 is rotated counterclockwise and in a latched position when shaft 121 is rotated clockwise. It is also contemplated that latch mechanism 34 could toggle between latched and unlatched positions when shaft 121 is rotated in the same direction. Further, it is contemplated that latch mechanism 34 is in its latched position when removable handle 130 is in its vertical position (seen in FIG. 4) and in its unlatched position when removable handle is in a horizontal position (seen in FIGS. 5 and 6). Although FIG. 7 shows latch mechanism 34 including first and second arms 48, 50, first and second arms 48, 50 are optional and are not required to obtain the benefit of the invention. Additionally, protector 110 can be used on both right hand and left hand doors.

Also, although the Figs. depict shroud 116 being substantially perpendicular to plate 112, it is within the scope of the invention for shroud 116 and plate 112 to be at an angle greater or less than 90 degrees. Although removable handle 130 is depicted as having handle portion 132 that is elongated and extends parallel to plate 112, removable handle 130 could have a different design. For example, handle 130 could be a traditional knob, or other handle shape. Although removable handle 130 depicts tab 138 extending downwardly, tab 138 could extend upwardly with connector 122 being closer to the bottom of shroud 116. Further, although puck lock 140 is shown to be keyed at a bottom or side of the puck lock, puck lock 140 could be keyed on its face.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A protector and handle assembly for use with a latch mechanism of a door, comprising:

a shaft configured to be coupled to a latch mechanism of a door, wherein the shaft is configured to removably engage a puck lock;

a handle configured to be removably coupled with the shaft when the shaft is not engaging the puck lock, wherein when the handle is coupled with the shaft, the handle is operable to move the shaft; and a shroud surrounding a portion of the shaft, wherein the shroud is adapted to receive the puck lock when the shaft engages the puck lock, and wherein the shroud is adapted to receive the handle when the handle is coupled with the shaft.

2. The invention of claim 1, wherein said shroud extends over an arc between 250 and 350 degrees.

3. The invention of claim 1 wherein said handle includes a tab projecting from said handle and said shroud includes a slot for receiving said tab to retain said handle on said shaft.

4. The invention of claim 1, further comprising a plate adapted to be fastened to said door, wherein the shroud extends from the plate, and wherein said plate and said shroud are generally perpendicular.

5. The invention of claim 3 wherein said handle and said tab are generally parallel.

6. The invention of claim 1 wherein said shaft is operable to rotate.

7. The invention of claim 6 wherein rotation of said shaft effects operation of the latch mechanism.

8. The invention of claim 3 wherein said tab engages said slot when said handle is moved to an unlatched position.

9. The invention of claim 8 wherein when said tab engages said slot, said handle is operable for pulling or pushing said door open or shut.

10. The invention of claim 3 wherein said slot extends from about ten percent to about eighty percent of the distance of said shroud.

11. The invention of claim 1 wherein when the shaft engages the puck lock on a first side of the door, said puck lock is operable to prohibit operation of the latch mechanism as a result of rotation of the shaft, and wherein the latch mechanism may be operated from a second side of the door even when the shaft engages the puck lock.

12. A method for operating a protector and handle assembly comprising a shaft that is coupled to a latch mechanism of a door, a handle that is removably coupled to the shaft and operable to move the shaft, and a shroud that surrounds a portion of the shaft and receives the handle when the handle is coupled to the shaft, the method comprising the steps of:

decoupling the handle from the shaft;

positioning a puck lock so that the puck lock is received by the shroud; and actuating said puck lock so that the puck lock engages the shaft.

13. The method of claim 12, further comprising:

disengaging the puck lock from the shaft;

removing said puck lock from the shroud;

coupling the handle to the shaft; and operating said handle to move said latch mechanism to an unlocked position.

14. The method of claim 12, wherein said shroud extends over an arc between 250 and 350 degrees.

15. The method of claim 12 wherein said handle includes a tab projecting from said handle and said shroud includes a slot for receiving said tab to retain said handle on said shaft.

16. The method of claim 12 wherein the protector and handle assembly further comprises a plate adapted to be fastened to the door, wherein the shroud extends from the plate, and wherein said plate and said shroud are generally perpendicular.

17. The method of claim 15 wherein said handle and said tab are generally parallel.

18. The method of claim 12 wherein said shaft is operable to rotate.

19. The method of claim 15 wherein said tab engages said slot when said handle is moved to an unlatched position.

20. The method of claim 12 wherein when the shaft engages the puck lock on a first side of the door, said puck lock is operable to prohibit operation of the latch mechanism as a result of rotation of the shaft, and wherein the latch mechanism may be operated from a second side of the door even when the shaft engages the puck lock.

* * * * *